(12) United States Patent
Williams et al.

(10) Patent No.: US 6,343,915 B2
(45) Date of Patent: Feb. 5, 2002

(54) MOLDED COOLING FAN

(75) Inventors: Eugene E. Williams, Frankfort; Jonathan B. Stagg, Greencastle, both of IN (US)

(73) Assignee: BorgWarner Inc., Troy, MI (US)

( * ) Notice: Subject to any disclaimer, the term of this patent is extended or adjusted under 35 U.S.C. 154(b) by 0 days.

(21) Appl. No.: 09/904,303

(22) Filed: Jul. 12, 2001

Related U.S. Application Data

(62) Division of application No. 09/470,802, filed on Dec. 23, 1999.

(51) Int. Cl.$^7$ .................................................. F01D 5/14
(52) U.S. Cl. ..................................... 416/234; 264/267
(58) Field of Search ...................... 264/267; 416/223 R, 416/234

(56) References Cited

U.S. PATENT DOCUMENTS

| | | | |
|---|---|---|---|
| 4,327,925 A | * | 5/1982 | Alexandria et al. ......... 264/267 |
| 4,396,351 A | | 8/1983 | Hayashi et al. |
| 4,671,739 A | | 6/1987 | Read et al. |
| 4,746,271 A | | 5/1988 | Wright |
| 4,826,645 A | | 5/1989 | Angus |
| 4,957,414 A | | 9/1990 | Willingham |
| 5,066,196 A | | 11/1991 | Morofushi |
| 5,075,066 A | * | 12/1991 | Terada et al. ............... 264/267 |
| 5,076,760 A | | 12/1991 | Weetman et al. |
| 5,507,622 A | | 4/1996 | Avny |
| 5,593,283 A | | 1/1997 | Scott |
| 6,193,916 B1 | * | 2/2001 | Richters et al. ............. 264/267 |

* cited by examiner

Primary Examiner—John Kwon
(74) Attorney, Agent, or Firm—Greg Dziegielewski

(57) ABSTRACT

A cooling fan assembly (10) includes a hubless polymer fan body molded around the perimetrical flange (20) of a metallic mounting hub (12). The fan body includes a circumferential ring (18) interlocked with the flange (20) and a plurality of fan blades (16) projecting outwardly from the ring (18). The fan body (14) is formed in an injection mold with molten polymer material being introduced into the mold at hot runner locations (25) disposed between the circumferential ring (18) and the root diameter (17) of the fan blades (16). At one face of the hubless fan (14), the circumferential ring (18) includes a plurality of uniformly spaced raised bosses (30). Each boss (30) defines a bore (31) configured to receive a balancing weight therein, preferably in the form of a balancing screw (35) threaded into the bore. The bosses (30) are interconnected by a stiffening ring (33) having a height substantially equal to the height (h) of the bosses (30). The stiffening ring (33) is modified between a plurality of pairs of bosses (30) to define a recessed flat (38). On the opposite face of the hubless fan (14), the circumferential ring (18) includes a plurality of raised tabs (40), arranged and configured to mate within a corresponding recessed flat (38). The corresponding recessed flats (38) and raised tabs (40) nest between stacked fan assemblies (10) to enhance the stability and increase the number and height of stacked sets of assemblies.

3 Claims, 4 Drawing Sheets

MOLDED COOLING FAN

This application is a divisional of U.S. application Ser. No. 09/470,802 filed Dec. 23, 1999, pending.

BACKGROUND OF THE INVENTION

The present invention relates to cooling fans such as fans used in connection with an automotive or industrial cooling system. More specifically, the invention pertains to fans with integral blades formed in a molding process, such as an injection molding procedure.

Most automotive and industrial power components require some form of auxiliary cooling system. In a typical automotive application, this cooling system includes a radiator and a cooling fan that directs air across the radiator. In these applications, the fan is mounted to a rotating flange of a fan drive that is separate from the power plant output.

In the early design of such cooling fans, metal blades were mounted to a metal hub, which hub was then attached to the fan drive. In recent years, however, high-strength polymer materials have been used to form various components of the fan. The polymer fan design was found to be capable of withstanding the normal forces and stresses endured by a cooling fan in even the heaviest duty automotive or industrial application. Moreover, the use of polymer materials provided a significant reduction in weight of the cooling fan. Moreover, and perhaps most significantly, the use of polymers generated significant benefits in the manufacture of the fan, since materials of this type readily lend themselves to a variety of molding processes.

The one-piece molded fan has eliminated the welds and rivets commonly associated with prior metal fans. In addition, the molding process facilitated the generation of smooth rounded contours, which ultimately reduced internal stresses within the fan structure.

In one type of molded fan design, the entire fan and hub are formed in a single piece. An example of this form of a one-piece molded fan is shown in U.S. Pat. No. 4,671,739 to Read et al. Fans of this type were found to be better suited for smaller duty applications, such as for use in the cooling system of passenger automobiles. For larger, higher stress applications, a hubless molded fan design was found to be more appropriate. One such design is depicted in U.S. Pat. No. 5,593,283 to Scott. In this design, a polymer hubless fan is integrally formed around a metallic mounting hub. This mounting hub can be supported within the molding apparatus, such as a typical injection molding machine. The polymer material is then injected into a mold surrounding the hub to form an interlocking ring around the metal hub.

In many automotive and industrial applications the molded fan includes a polymer, such as polypropylene, nylon or other resin compositions. In addition, many industrial fans include reinforcing material such as glass fibers or nylon strands. The reinforcing material can be oriented within the structure of the molded fan blade to provide additional strength and stiffness where needed based upon stress analysis of the working fan.

The hubless fan design has evolved since its inception. While the metal mounting hub provides a certain degree of strength to the overall fan, the molded fan can include an enlarged polymer ring formed around the mounting hub. This ring helps provides strength and bending or flexure stiffness to the root of each of the fan blades.

While the hubless polymer fan represents an improvement over prior metal and one-piece polymer fan constructions, improvements are still needed. For instance, cost and material considerations are implicated by current molded fan designs involving significant material waste. Cost considerations are also involved in the storing and shipping of an inventory of fans. There remains a need for a molded fan assembly that reduces the overall costs associated with manufacturing and shipping the final fan product.

SUMMARY OF THE INVENTION

In order to address the needs unmet by prior fan designs, the present invention contemplates a fan assembly comprising a substantially rigid hub configured for mating with a fan drive and defining a perimetrical flange. A hubless fan includes a circumferential ring molded about the perimetrical flange of the rigid hub, and a plurality of outwardly projecting fan blades integrally formed with the ring.

In one embodiment of the invention, the hubless fan further includes a plurality of hot runners for introduction of molten material into the hubless fan that are radially disposed between the circumferential ring and the root diameter of the fan blades. With this feature, molten polymer material is distributed more uniformly throughout the molded hubless fan. Moreover, less material is wasted in the form of a cold sprue that must be trimmed from the completed fan assembly. In a further aspect, each of the hot runners is raised relative to the circumferential ring, which allows the hot runners to have a larger diameter to accept greater flow of molten material into the hubless fan mold.

In a further embodiment of the invention, the circumferential ring of the hubless fan defines a plurality of bores dispersed about the circumference of the ring. Each of the bores is configured for receiving a balance weight therein. In the most preferred embodiment, the balance weight is in the form of a screw having a known weight and including self-tapping threads for screwing into a specific one of the bores. The ring defines a predetermined number of the bores radially aligned with a corresponding one of the fan blades, namely four such bores in the most preferred embodiment. Standard rotating body balancing techniques can be used to determine the magnitude of weight and the boss location for the addition of the balancing screw.

In another aspect of this inventive feature, the circumferential ring includes a plurality of raised bosses in which each of the bosses includes a corresponding one of the plurality of bores. The bosses have a height from the circumferential ring, and the bores have a depth no greater than that height to avoid compromising the body of the circumferential ring supporting the fan blades. A stiffening ring is formed between and interconnecting adjacent ones of the plurality of raised bosses that has a height substantially equal to the raised height of the bosses.

The present invention also provides a feature to enhance the stackability of the fan assemblies. In another aspect of the invention, the stiffening ring defines at least two recessed flats between a corresponding adjacent pair of raised bosses. The stiffening ring has a reduced height at each of the recessed flats that is less than the height of the stiffening ring of bosses. On the opposite face of the hubless fan, the circumferential ring further includes at least two raised tabs projecting therefrom. Each of the tabs is sized and arranged to reside within a corresponding one of the recessed flats. Thus, when two or more of the hubless fans are stacked, the raised tabs of one of the fans nests within corresponding ones of the recessed flats of an adjacent one of the hubless fans.

In a preferred embodiment, the number of raised tabs and recessed flats equals the number of fan blades. The tabs and flats can be situated in radial alignment with the gap between adjacent fan blades.

It is one object of the present invention to provide a fan assembly utilizing a hubless fan that minimizes the amount of material required to form the fan in a molding process. Reducing the amount of material waste is also accomplished by features of the invention that eliminate the need to trim blade material for balancing the fan assembly.

Another object of the invention is directed to improving the stackability of molded fan assemblies. An added object resides in features that enhance the stability of a stack of such fan assemblies.

Other objects and particular benefits of the invention will become apparent to a person of skill in this art upon consideration of the following written description and accompanying figures.

DESCRIPTION OF THE PREFERRED EMBODIMENTS

Figure 1:
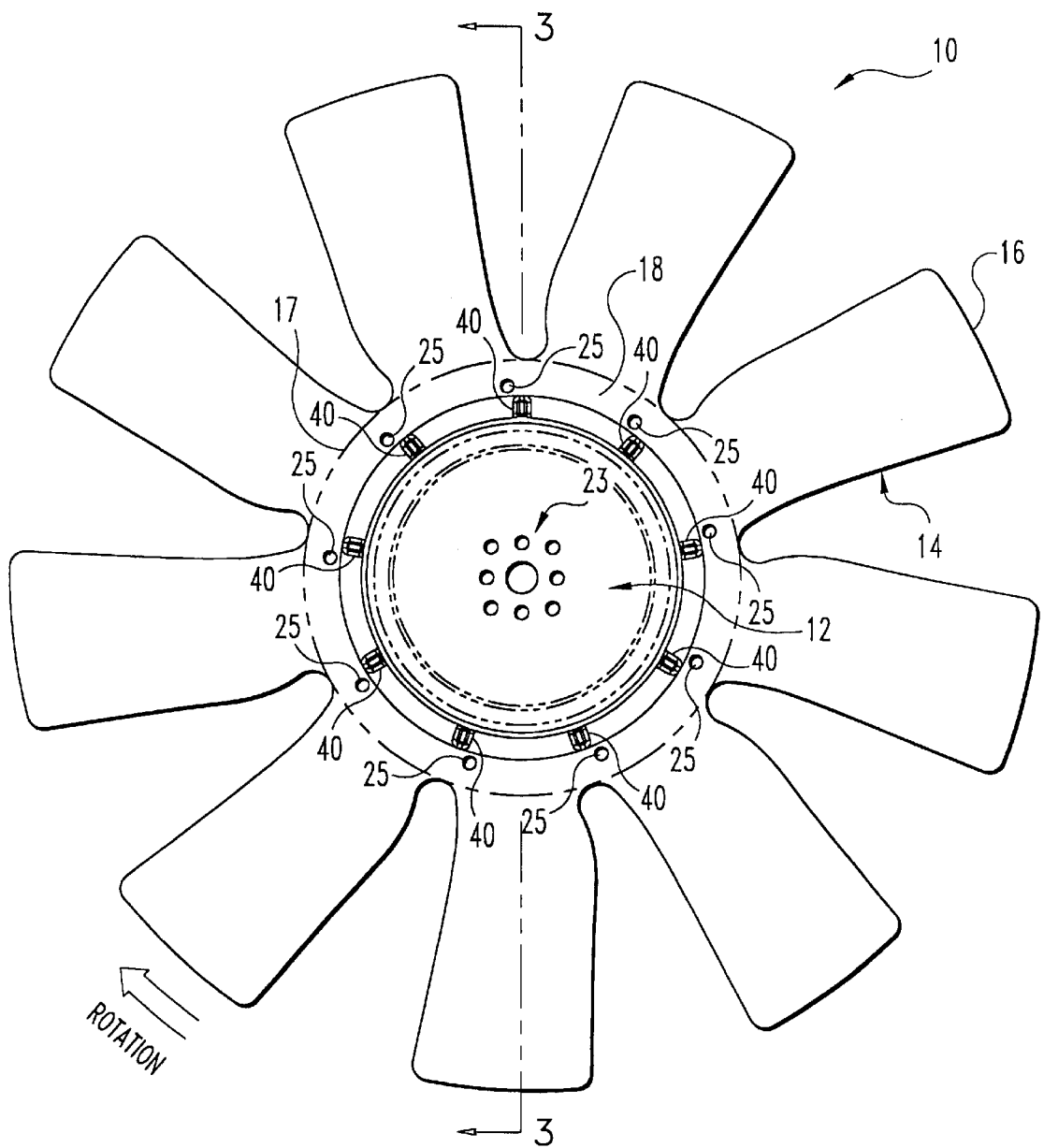
FIG. 1 is a top elevational view of a fan assembly according to one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention which would normally occur to one skilled in the art to which the invention relates.

Referring to FIG. 1, a fan assembly 10 is depicted which includes a mounting hub 12 and a separate hubless fan 14. In the preferred embodiment, the mounting hub 12 is formed of metal and is most preferably configured as a stamped circular plate. The configuration of the mounting hub 12 will vary depending upon the fan drive to which the fan assembly 10 is connected. In the illustrated embodiment, the mounting hub 12 includes a mounting hole array 23 that includes a number of openings for receiving mounting bolts of the fan drive. In some instances, the mounting hub 12 can simply constitute a flat annular disc. In other instances, such as that depicted in the side cross-sectional view of FIG. 3, the mounting hub 12 is dish-shaped. It is understood, of course, that the configuration of the mounting hub 12 is not essential to the present invention, and instead can be dictated by the application of the particular fan assembly 10.

The hubless fan 14 in the preferred embodiment is a molded polymer fan that includes integrally molded blades 16. In the illustrated embodiment the hubless fan 14 includes nine (9) blades and has a diameter of 28 inches (71cm.). The number of blades and their configuration (e.g., thickness, chord dimensions and curvature) can be dictated by the specific application for the fan assembly 10. The fan assembly 10 of this configuration can be used in a variety of applications, such as for a medium-duty truck cooling system fan.

Each of the blades 16 is integrally formed with a uniformly molded polymer ring 18. The ring 18 presents a region of increased thickness relative to the thickness of each of the blades 16. In addition, the ring 18 is molded around the perimeter flange 20 (see FIG. 3) of the mounting hub 12. The molded ring 18 and perimeter flange 20 are most preferably of an interlocking design. In other words, the flange 20 can include a plurality of openings 21 defined therethrough. When the hubless fan 14 is molded about the mounting hub 12, the polymer material flows through each of the openings 21 and sets in place to form the molded ring 18. This interlocking feature prevents the hubless fan 14 from rotating relative to the mounting hub 12.

Since the hubless fan 14 is a molded polymer material, the fan includes a number of locations at which the molten polymer material is introduced. More specifically, the fan 14 includes a plurality of hot runners 25 dispersed circumferentially around the molded ring 18 of the fan. Each of the hot runners 25 is arranged between adjacent blades 16 so that the weld line or knit line is located generally in the center of each blade, as is known in the art. However, in one unique aspect of the invention, the hot runners 25 are situated between the molded ring 18 and the root diameter 17 of each of the fan blades 16.

In a further departure from prior fan molding processes, the hot runners 25 in accordance with the present invention are raised slightly from the surface of the molded ring 18 of the hubless fan 14. Increasing the height of the hot runners allows these runners to be larger than in prior systems. This increased runner size, coupled with locating the runners outboard of the molded ring 18, allow the present molded fan 14 to be formed more efficiently with less material waste.

In prior molding processes, a cold sprue and runner system is utilized in which the sprue and runners are situated at the interior of the hubless fan body. A molding arrangement of this type is shown in U.S. Pat. No. 4,957,414 to Willingham. In practice, the cold sprues or slugs must be removed after the fan has been assembled. With the present invention, the location of the hot runners does not require the same sprue removal step. This approach of the present invention reduces the amount of material that must be removed, and therefore reduces the amount of waste associated with the manufacture of each fan assembly 10. Moreover, locating the hot runners outboard of the molded ring 18 allows the molten polymer material to flow more uniformly into the fan blade mold regions and into the ring mold sections. This increased flow uniformity results in a hubless fan blade with significantly fewer material voids that might compromise the integrity and strength of the fan assembly 10.

A further feature of the invention pertains to balancing the fan assembly. It is of course well known that any rotating component must be balanced to avoid excessive vibration and torque. In a typical prior art molded fan, this balancing is accomplished by removing material from the tips of one or more fan blades. This process is cumbersome and wasteful of material, and in some instances disruptive of the overall performance of the fan assembly. Moreover, removing blade material leaves little room for error—the excised material cannot be restored if the fan assembly is not balanced. In extreme cases, an entire fan assembly may be scrapped if the balancing process leads to the removal of too much blade material.

Figure 2:
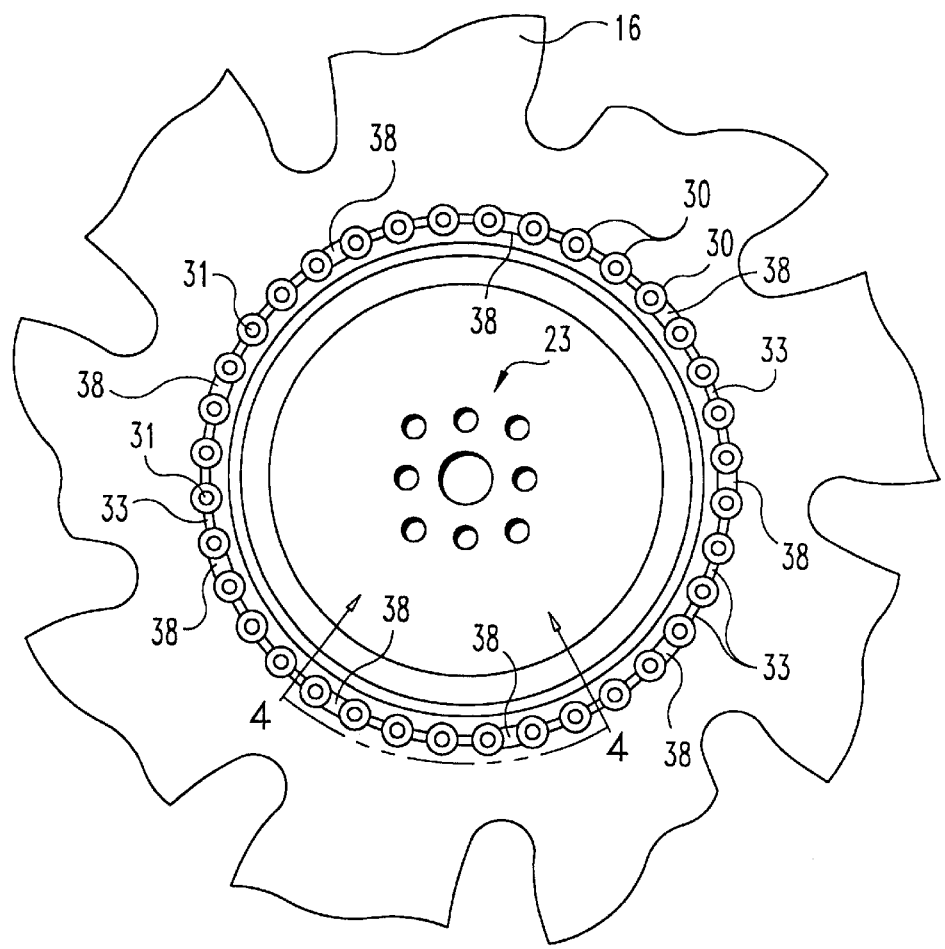
FIG. 2 is a partial bottom elevational view of the opposite side of the fan assembly shown in FIG. 1.

In accordance with the present invention, the molded hubless fan 14 is provided with a ring of balance bosses 30 formed at one side of the molded ring 18 of the fan 14, as seen best in FIG. 2. These balance bosses 30 are preferably uniformly dispersed around the inner perimeter of the hubless fan 14 adjacent the root of each of the blades 16, and most preferably are formed as part of the molded ring 18. In the preferred embodiment, four (4) such balance bosses 30 are aligned with each blade 16.

Figure 4:
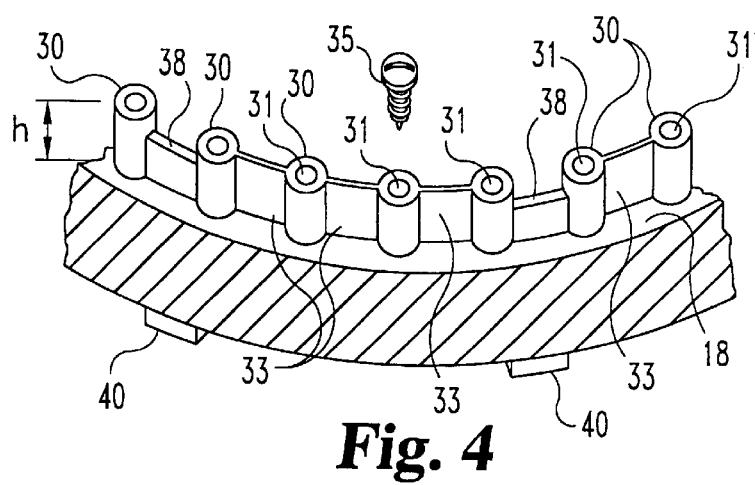
FIG. 4 is a partial cross-sectional view of the fan assembly depicted in FIG. 2, taken along line 4—4 as viewed in the direction of the arrows.

Each of the balanced bosses 30 defines an internal bore 31 that is configured to receive a balance weight, such as a rivet or screw therein. In a specific embodiment, as depicted in FIG. 4, the balance weight is a balance screw 35 that is threaded into the bore 31 of a particular balance boss 30. Each balance screw 35 can have a known weight, and a selection of differently weighted balance screws 35 can be provided. The circumferential location and necessary weight for balancing the fan assembly 10 can be established using traditional rotating balancing techniques.

In order to preserve the integrity of the molded ring 18 of the hubless fan 14, the balance screws 35 are sized to be entirely disposed within the balance boss 30. In other words, each of the bosses 30 projects upward from the molded ring 18 by a predetermined height h (FIG. 4). In one specific embodiment, that height h is about 0.375 inches (0.95 cm.). For this specific embodiment, the balance screws have a threaded length of less than the boss height. The balance screw 35 can have a variety of configurations. For instance, the enlarged head of screw 35 can be eliminated, the threads can be self-tapping or eliminated in favor of a press-fit configuration, etc.

With the added height provided by each of the balance bosses, the hubless fan 14 further includes a stiffening ring 33 extending between each boss, as depicted best in FIGS. 2 and 4. Nominally, the stiffening ring 33 has a height equal to the height h of each of the balance bosses 30. In the illustrated embodiment, the balance bosses are uniformly spaced about the circumference of the molded ring. Alternatively, non-uniformly spaced bosses may be utilized, as well as varying numbers and sizes of such bosses, provided that a sufficient number of balance bosses are available to accurately balance the fan assembly 10. For larger fan assemblies, two or more rows of balance bosses, such as bosses 30 can be provided, with bosses in adjacent rows offset relative to each other.

In a further aspect of the invention, the stiffening ring 33 is modified between a few pairs of balance bosses 30 to define a recessed flat 38. More specifically, a pair of balance bosses 30 associated with each pair of fan blades 16 includes the recessed flat 38 defined therebetween. The recessed flat preferably has a thickness greater than the thickness of the stiffening ring. On the other hand, the flat 38 has a height that is less than the height h of the balance bosses 30, as best seen in FIG. 4.

Figure 3:
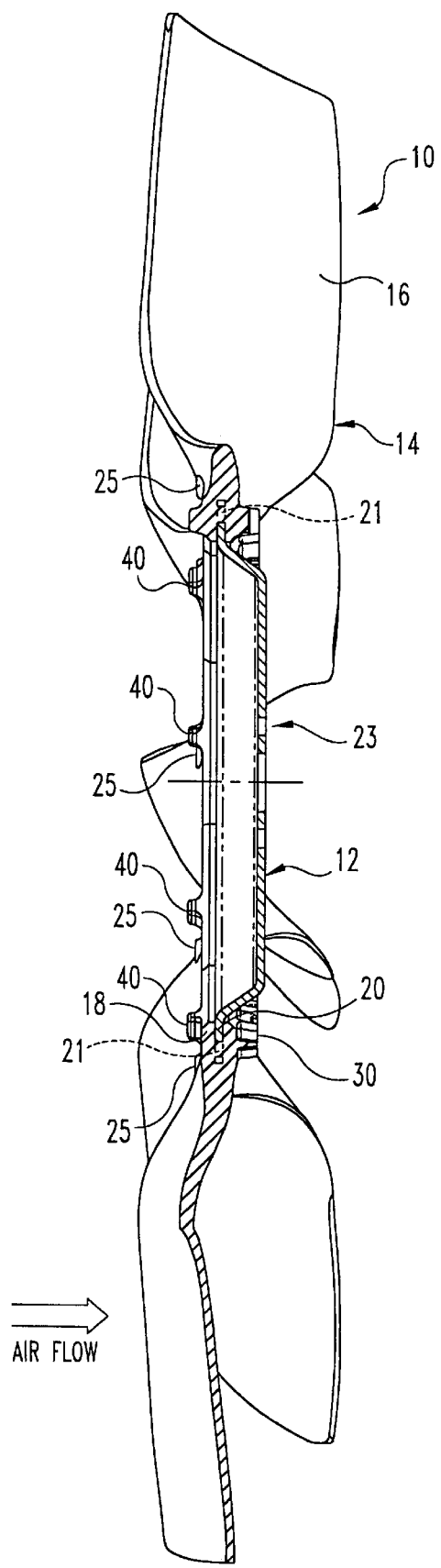
FIG. 3 is a side cross-sectional view of the fan assembly shown in FIG. 1 taken along line 3—3 as viewed in the direction of the arrows.

The position of each of the recessed flats 38 corresponds to the position of a plurality of raised tabs 40 are formed on the opposite surface of the molded ring 18. The position of the tabs 40 is best seen in FIGS. 1 and 3. The raised tabs 40 are dimensioned to fit in contact with the recessed flats 38 between adjacent balance bosses 30. In a specific embodiment, the raised tabs 40 have a height equal to the depth of the recessed flats 38 below the top surface of the balance bosses 30. In a specific embodiment, that height is about 0.25 inches (0.6 cm.).

As can be seen by a comparison of FIGS. 1 and 2, the number and location of the raised tabs 40 corresponds to the number and location of recessed flats 38. In the illustrated embodiment, nine such tabs 40 and flats 38 are provided, each being oriented in the gap between adjacent blades 16. Of course, other orientations and numbers of flats and tabs can be provided, as long as the same number and positioning of one component relative to the other component is maintained.

It is known that newly manufactured fan assemblies are stacked for storage or shipping. In the usual case, the fan blades rest upon each other to support adjacent fan assemblies in the stack. This stacking arrangement is unstable and often detrimental to the fan blades. In other fan designs, the inner ring of the fans are stacked on top of each other. In this instance, the fan blades are protected, but the resulting stack is again unstable. Moreover, the stackable height of the fan assemblies is limited when stacked in this manner.

Figure 5:
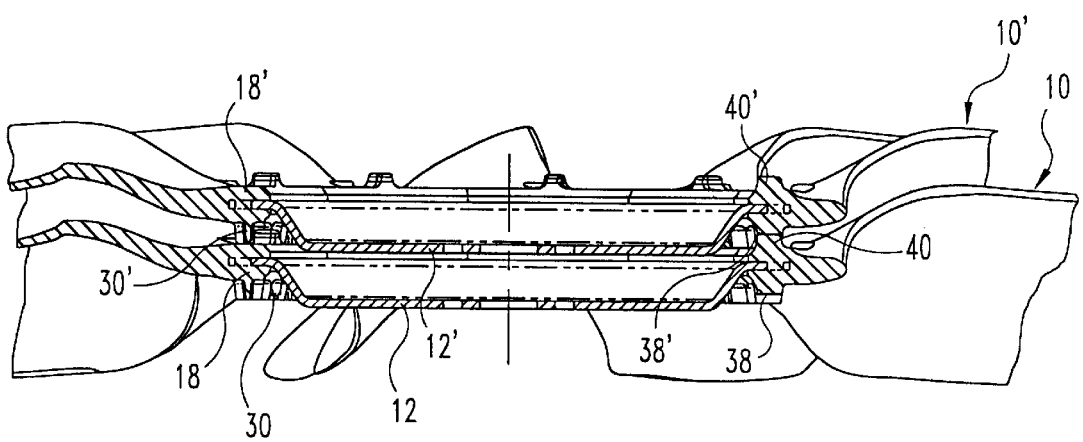
FIG. 5 is a side, partial cross-sectional view of a pair of fan assemblies such as the assemblies of FIGS. 1 and 2, shown in a stacked configuration.

Referring to now to FIG. 5, the purpose behind the recess flats 38 and raised tabs 40 can be discerned. In order to address these aforementioned problems with prior molded fan designs, the present invention contemplates that each of the raised tabs 40 reside or interlock within a corresponding flat 38 between adjacent balance bosses 30. This interlocking stacked relationship is depicted at FIG. 5 in which a first fan assembly 10 and second fan assembly 10' are stacked together. In this arrangement, it can be seen that the raised tab 40 of fan assembly 10 contacts the recessed flat 38' of fan assembly 10'. With this arrangement, the mounting hub 12' and the blades 16' can nest within the corresponding hub 12 and blades 16.

This nesting capacity reduces the overall height of the stack of fan assemblies 10, 10', etc. In addition, the interlocking aspect of the tabs and flats greatly increases the stability of the stack of fan assemblies, increased stability means that a higher, more stable, stack of fan assemblies can be provided for transport or storage than with prior fan assembly designs.

While the invention has been illustrated and described in detail in the drawings and foregoing description, the same is to be considered as illustrative and not restrictive in character. It should be understood that only the preferred embodiments have been shown and described and that all changes and modifications that come within the spirit of the invention are desired to be protected.

What is claimed is:

1. A fan assembly (10) comprising:

a substantially rigid hub (12) configured for mating with a fan drive and defining a perimetrical flange (20);

a hubless fan (14) defining a circumferential ring (18) molded about said perimetrical flange (20) of said rigid hub (12) and a plurality of outwardly projecting fan blades (16) integrally formed with said ring (18), said plurality of blades defining a root diameter (17) radially outboard of said circumferential ring (18);

said hubless fan (14) further including a plurality of hot runners (25) for introduction of molten material into said hubless fan (14), said hot runners (25) being radially disposed between said circumferential ring (18) and said root diameter (17).

2. The fan assembly (10) according to claim 1, wherein each of said hot runners (25) is raised relative to said circumferential ring (18).

3. The fan assembly (10) according to claim 1, wherein said hubless fan (14) defines a gap between adjacent fan blades (16) and includes a hot runner (25) radially aligned with each said gap.

* * * * *